(12) United States Patent
Chong

(10) Patent No.: US 7,323,680 B2
(45) Date of Patent: Jan. 29, 2008

(54) OPTICAL DEFLECTION PROBE AND OPTICAL DEFLECTION PROBE DEVICE

(75) Inventor: Changho Chong, Komaki (JP)

(73) Assignee: Santec Corporation, Komaki (JP)

( * ) Notice: Subject to any disclaimer, the term of this patent is extended or adjusted under 35 U.S.C. 154(b) by 64 days.

(21) Appl. No.: 11/401,445

(22) Filed: Apr. 11, 2006

(65) Prior Publication Data
US 2006/0255250 A1    Nov. 16, 2006

(30) Foreign Application Priority Data
Apr. 12, 2005    (JP) .............................. 2005-114300

(51) Int. Cl.
H01J 3/14         (2006.01)
H01J 5/16         (2006.01)
H01J 40/14        (2006.01)
(52) U.S. Cl. ................. 250/234; 250/216; 250/227.11; 250/578.1; 359/291
(58) Field of Classification Search ................. 250/216, 250/227.11, 234, 236, 578.11, 227.24, 227.26; 35/511, 317, 318, 417; 359/290, 291, 824, 359/212, 223, 224, 872, 877; 385/14–18, 385/24; 606/3, 15, 16; 600/341, 342, 473, 600/476, 478, 182; 73/800
See application file for complete search history.

(56) References Cited

U.S. PATENT DOCUMENTS

| 6,069,698 | A |  | 5/2000 | Ozawa et al. |
| 2003/0063891 | A1 | * | 4/2003 | Kim ........................... 385/140 |
| 2003/0176777 | A1 | * | 9/2003 | Muller-Dethlefs .......... 600/322 |
| 2004/0174538 | A1 | * | 9/2004 | Opsal et al. ................. 356/601 |

OTHER PUBLICATIONS

Bouma, E. B. (editor), Handbook of Optical Coherence Tomography, 2002, pp. 364-367.

* cited by examiner

*Primary Examiner*—Georgia Epps
*Assistant Examiner*—Francis M LeGasse, Jr.
(74) *Attorney, Agent, or Firm*—Smith Patent Office

(57) ABSTRACT

An optical fiber transmits signal light and the excitation light for driving an actuator each having a different wavelength to a probe. In the probe, the signal light and excitation light are separated from each other by an optical filter and the excitation light is irradiated to a photo diode. The signal light is supplied to a MEMS mirror unit. Then, the MEMS mirror unit is driven by an electromotive force obtained by the photo diode. In this manner, by modulating intensity of the excitation light, the signal light can be deflected.

19 Claims, 11 Drawing Sheets

F I G. 1
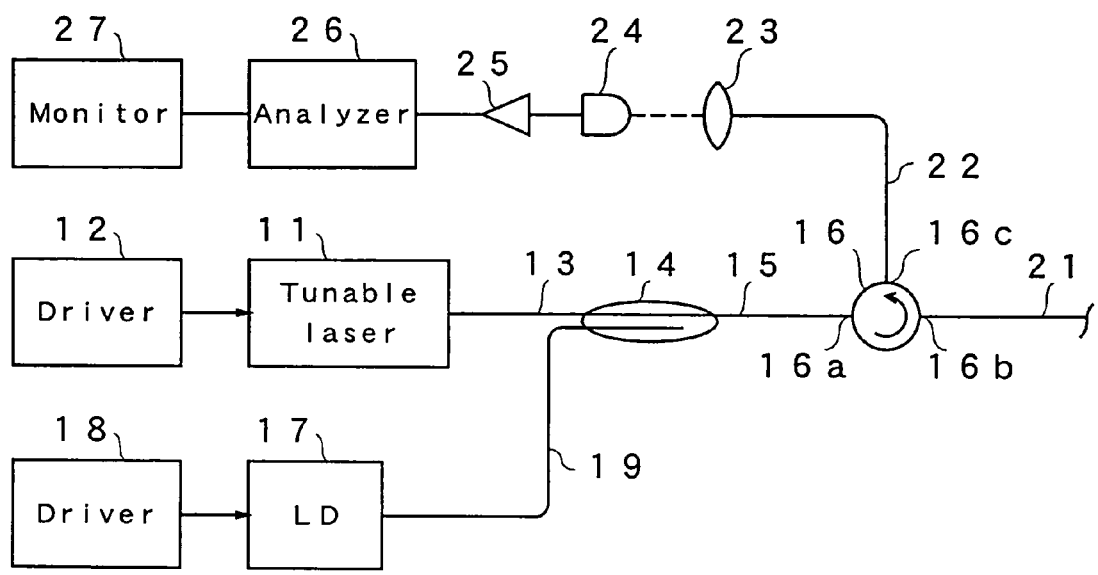

F I G. 6
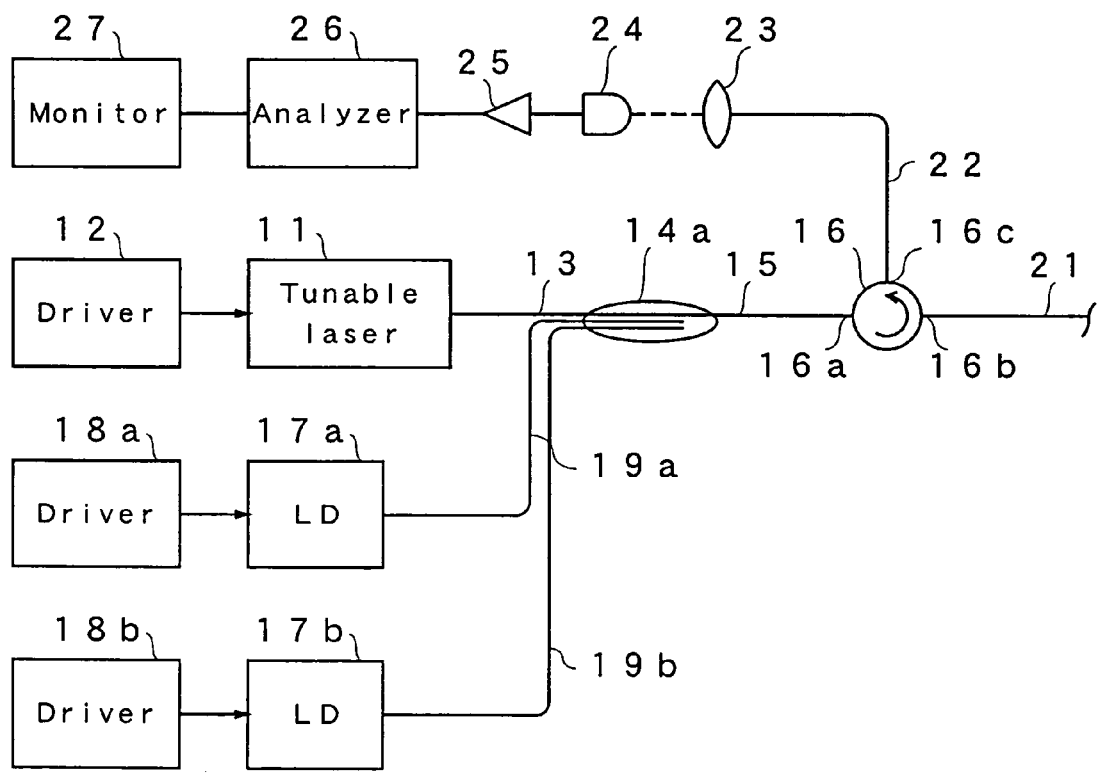

F I G. 9 A
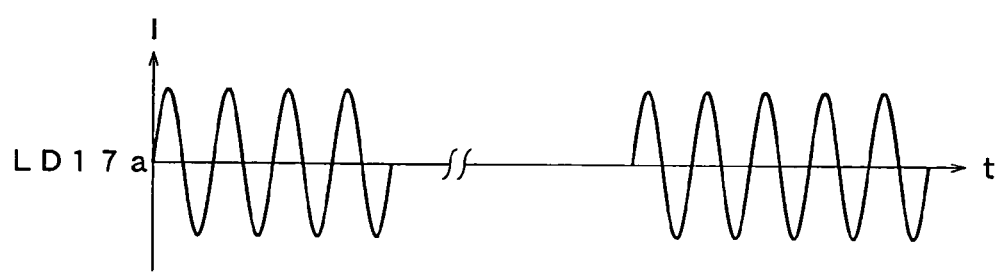
F I G. 9 B
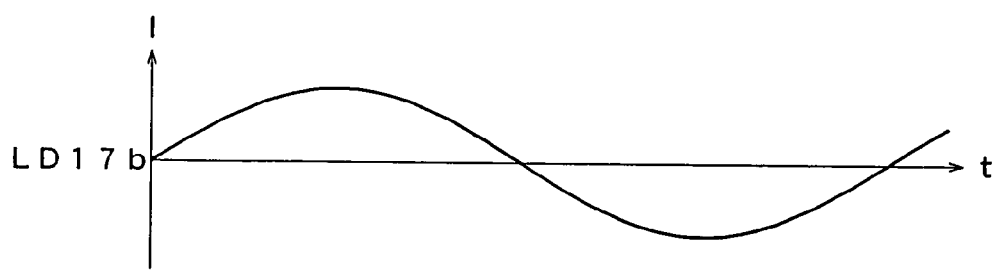

OPTICAL DEFLECTION PROBE AND OPTICAL DEFLECTION PROBE DEVICE

BACKGROUND OF THE INVENTION

1. Field of the Invention

The present invention relates to an optical deflection probe for deflecting a light beam to scan a measuring object and an optical deflection probe device using this probe.

2. Discussion of the Related Art

Devices for scanning a measuring object by deflecting a laser beam and for observing the state of the measuring object using a reflected light thereof have been conventionally used. Especially in a medical field, optical diagnosis is considered to be able to make a diagnosis requiring urgent treatment smooth and to observe a process during treatment in a noninvasive, in principle, manner without imposing a burden such as a pain on a client, and thus, expected to greatly contribute to medical care. According to such optical diagnosis, by inserting an optical probe or an endoscope into a living body, applying a signal light on a region of the living body via an optical fiber, propagating light returned backward using the same optical fiber and analyzing its strength, frequency components, etc., the state of the region is diagnosed. For example, in the pages 364 to 367 of "Hand book of optical Coherence Tomography", edited by E. B. Bouma, 2002 discloses Optical Coherent Tomography (OCT) of interfering a signal light sent from the object or the inside of the living body by an interferometer and obtaining tomographic information of an extreme high resolution from frequency analysis of the interfered signal. Here, tomographic measurement is possible by using a wideband light source or a tunable light source as a light source.

Furthermore, an optical diagnosis method of applying a fluorescent material on a measuring region, irradiating light and observing a fluorescence spectrum to diagnose the surface state is used. Both of these methods require deflection of light in scanning a measuring object to obtain an image as two-dimensional image information.

Optical fiberscopes and their probes used in endoscopes or intravascular image diagnosis devices, as disclosed in U.S. Pat. No. 6,069,698, have been used in a diagnosis of pathologic tissue or the like in a manner that scans and irradiates light in the circumferential direction on region by rotating the optical fiber itself with a motor or the like or incorporating a rotating mirror in a front end of a catheter, and images or disperses the reflected light.

SUMMARY OF THE INVENTION

However, when an optical fiber is rotated within twisted tracts in a living body, the optical fiber may be twisted and broken by undesired stress or torsion. Furthermore, when the motor for rotating the mirror is provided in the probe, an electrical wire for driving needs to be additionally installed and thus, the probe cannot be applied to a region such as a blood vessel having a small inner diameter. In addition, since a micromotor is expensive, disposable probes suitably used in the actual medical situation cannot be realized.

To solve the above-mentioned conventional problems, an object of the present invention is to provide an optical deflection probe capable of deflecting light at its front end without rotating the fiber or using the motor and an optical deflection device using the probe.

An optical deflection probe device of the present invention comprises: a first light source for emitting signal light; a second light source for emitting excitation light which has different wavelength from that of said signal light and whose optical intensity can be modulated; an optical fiber connected to said first and second light sources at one end thereof for simultaneously transmitting said signal light, excitation light and reflected light; and a probe provided at other end of said optical fiber, wherein said probe includes: an optical filter for separating said signal light from excitation light emitted from the other end of said optical fiber; a photoelectric conversion element for receiving excitation light separated by said optical filter; and an optical deflector that is driven due to an electromotive force obtained by said photoelectric conversion element and deflects the signal light separated by said optical filter.

An optical deflection probe device of the present invention comprises: a first light source for emitting signal light; a second light source for emitting first excitation light which has different wavelength from that of said signal light and whose optical intensity can be modulated; a third light source for emitting second excitation light which has different wavelength from those of said signal light and first excitation light and whose optical intensity can be modulated; an optical fiber connected to said first, second, and third light sources at one end thereof for simultaneously transmitting said signal light, first and second excitation lights and reflected light; and a probe provided at other end of said optical fiber, wherein said probe includes: optical filters for splitting into said signal light, first excitation light and second excitation light emitted from the other end of said optical fiber; a first photoelectric conversion element for receiving first excitation light separated by said optical filters; a second photoelectric conversion element for receiving second excitation light separated by said optical filters; and an optical deflector that is driven due to electromotive forces obtained by said first and second photoelectric conversion elements and deflects the signal light separated by said optical filters to directions different from each other.

An optical deflection probe of the present invention comprises: an optical filter which connects to an optical fiber transmitting signal light and excitation light which has different wavelength from that of said signal light, and which separates said signal light from excitation light emitted from the other end of said optical fiber; a photoelectric conversion element for receiving excitation light separated by said optical filter; and an optical deflector that is driven due to an electromotive force obtained by said photoelectric conversion element and deflects the signal light separated by said optical filter.

An optical deflection probe of the present invention comprises: optical filters which connect to an optical fiber transmitting signal light, first and second excitation lights which have different wavelengths from each other and splits into said signal light, first excitation light and second excitation light emitted from the other end of said optical fiber; a first photoelectric conversion element for receiving first excitation light separated by said optical filters; a second photoelectric conversion element for receiving second excitation light separated by said optical filters; and an optical deflector that is driven due to electromotive forces obtained by said first and second photoelectric conversion elements and deflects the signal light separated by said optical filters to directions different from each other.

The optical deflector can be a MEMS type mirror unit.

The optical deflector can include a mirror and a piezo actuator for driving said mirror.

The probe can further include a reflector unit for reflecting light passing through said optical filter toward said optical deflector.

The probe can further include a reflector for further reflecting light deflected by said optical deflector.

The optical deflector can be a MEMS type mirror unit, and said probe can include a reflector unit for reflecting light passing through said optical filter toward said MEMS type mirror unit and further reflecting the reflected light from said MEMS type mirror unit.

According to the present invention, since a signal light is deflected using excitation light transmitted via the optical fiber, it is unnecessary to provide an electrical power source for deflection and an additional cable. Furthermore, since the light is deflected by an optical deflector, the optical fiber need not be rotated resulting in an extreme simple configuration. Therefore, the present invention can provide the minute optical deflection probe and probe device and widely apply to the medical field. Since a rotating mechanism for the optical fiber becomes unnecessary, there occurs no accident of cutting the optical fiber. Further, since the probe is formed of a photoelectric conversion element and the optical deflector, the probe can be manufactured at very low cost. Thus, it is possible to provide a disposable probe.

Furthermore, the present invention can be also applied to various devices for deflecting light in a minute region in addition to the medical field. Moreover, the present invention can be applied to various devices to prevent change and deterioration with age by observing the state of materials in industrial products and equipment in a nondestructive manner and observing the cross section or tomographic layer of a minute area that is located beyond reach, such as in a pipe, or requires remote monitoring.

BREIF DESCRIPTION OF THE DRAWINGS

FIG. 1 is a block diagram of a diagnosis device in accordance with a first embodiment of the present invention;

FIG. 6 is a block diagram of a diagnosis device in accordance with a second embodiment;

FIG. 9A is a waveform chart showing an output waveform of a laser diode $17a$ in accordance with the second embodiment;

FIG. 9B is a waveform chart showing an output waveform of a laser diode $17b$ in accordance with the second embodiment;

DESCRIPTION OF THE PREFERRED EMBODIMENTS

First Embodiment

Figure 2:
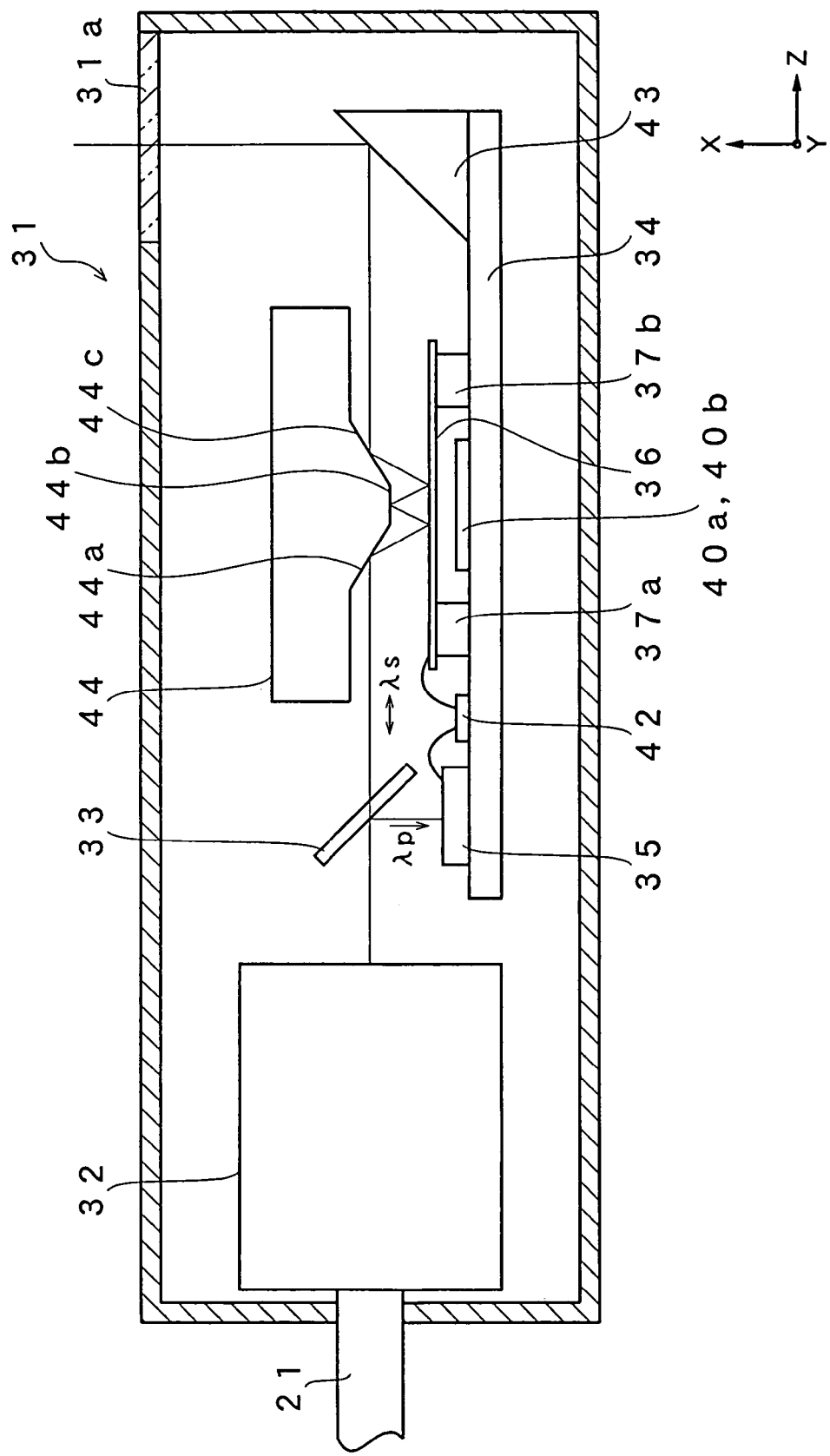
FIG. 2 is a cross-section view of a probe in accordance with the first embodiment.

A first embodiment of the present invention will be described. FIG. 1 is a block diagram showing a configuration of a diagnosis device in accordance with the first embodiment. In FIG. 1, a tunable laser 11 is driven by a driver 12, outputs signal light having a wavelength of λs, for example, 1.3 μm band and forms a first light source together with the driver 12. The driver 12 periodically varies the wavelength of λs, for example, within the range of 100 nm. An output of the tunable laser 11 is supplied to an optical coupler 14 via an optical fiber 13. At the output side of the optical coupler 14 is provided an optical fiber 15, to which an optical circulator 16 is connected. The optical circulator 16 has terminals $16a$, $16b$ and $16c$. The light applied to the terminal $16a$ is emitted from the terminal $16b$ and the light applied to the terminal $16b$ is emitted from the terminal $16c$. A laser diode 17 (LD) outputs excitation light having a waveband λp, for example, 1.55 μm band, which is different from that of the light from the tunable laser 11. The laser diode 17 is driven by the driver 18 and forms a second light source together with the driver 18. As described later, the driver 18 modulates intensity of the laser diode 17 at a certain cycle and supplies an output of the laser diode 17 to the optical coupler 14 via an optical fiber 19. The optical coupler 14 combines the lights sent from the optical fibers 13 and 19. The optical circulator 16 provides an optical fiber 21 at the side of the terminal $16b$. The optical fiber 21 transmits the signal light and the excitation light to the probe side and transmits the reflected light from the probe to an analyzer side.

Next, an optical fiber 22 is connected to the terminal $16c$ of the optical circulator 16 and one end of the optical fiber 22 is connected to a lens 23 and a photo diode 24. The photo diode 24 converts an optical signal into an electric signal and an output of the photo diode 24 is supplied to an analyzer 26 via an amplifier 25. The analyzer 26 generates image information on the basis of the intensity or frequency change of the reflected light and outputs the image information on a monitor 27.

Figure 3:
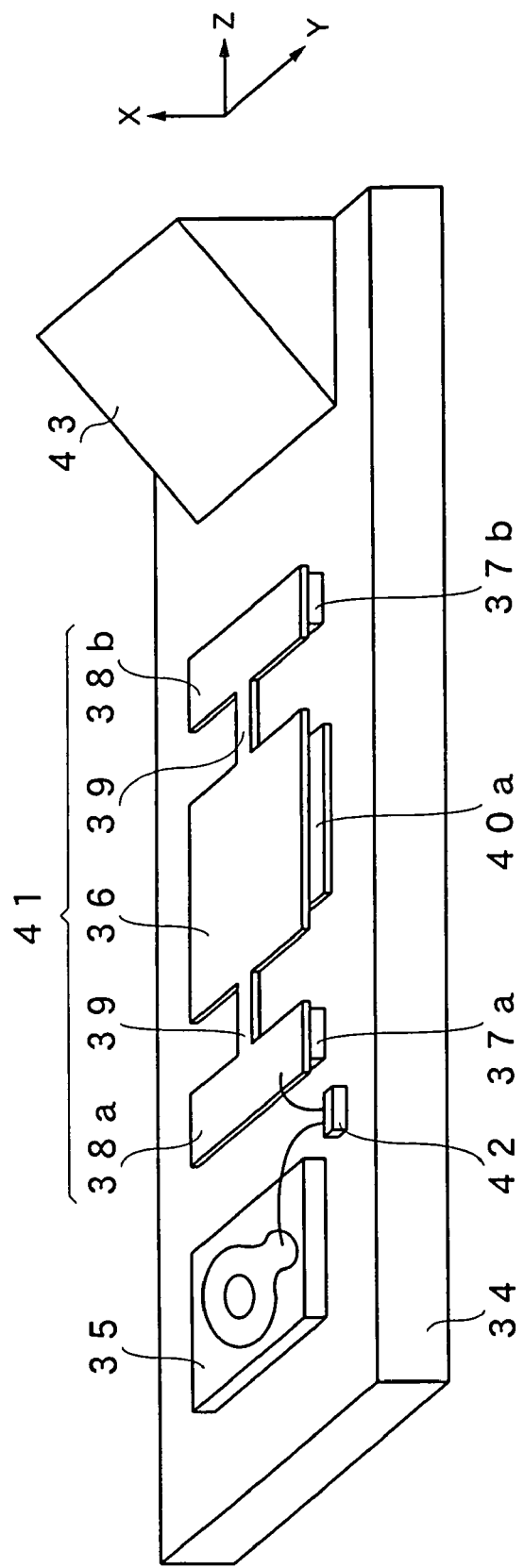
FIG. 3 is a perspective view showing a main part of the probe in accordance with the first embodiment.

Next, the configuration of the probe will be described referring to FIGS. 2 and 3. FIG. 2 is a schematic view showing a cross-section of the probe 31 and FIG. 3 is a perspective view showing a main part of the probe 31. The probe 31 is shaped like a narrow cylinder and connected to one end of the optical fiber 21. In the probe 31, as shown in FIG. 2, a GRIN lens 32 is provided with one end of the optical fiber 21. The GRIN lens 32 emits light propagated through the optical fiber 21 as light collimated to a Z axis. An optical filter 33 for diverging the light by wavelength is set at the emitting side of the GRIN lens 32 at an angle of 45 degrees relative to an optical axis. The optical filter 33 separates the emitted light into the signal light and the excitation light, for example, reflects the light of wavelength λp from the laser diode 17 and let the light of wavelength λs from the tunable laser 11 pass through. The optical filter 33 may be an optical lowpass filter for letting the light having a 1.3 μm waveband band pass through or an optical bandpass filter. On the contrary, in the case where passing through and reflection are reversed, the optical filter 33 may be an optical highpass filter. As shown in FIG. 2, a long and thin flat plate-like platform 34 in parallel with a Y-Z plane is set at the optical axis side of the GRIN lens 32. A photo diode 35 is installed on the platform 34 where the excitation light diverged by the optical filter 33 is received. The photo diode 35 is a photoelectric conversion element for generating the excitation light from the photo diode 17 into an electromotive force. As shown in FIG. 3, a holder of a tilt mirror 36 is provided on the platform 34 along the Z axis. The holder includes spacers 37a and 37b and a first electrode 38a and 38b on the spacers 37a, 37b. The tilt mirror 36 is rotatably held by the spacers 37a, 37b via hinges 39. A line parallel to the z axis that passes through centers of the hinges 39 and the tilt mirror 36 is a rotational axis of the tilt mirror 36. Second electrodes 40a are formed on the platform 34 and below the tilt mirror 36 to be divided along the rotational axis. As the figures shown, the tilt mirror 36 is an elongated member and its surface serves as both a mirror and an electrode. When a voltage is applied between the first electrode 38a and one of the second electrode 40a, the tilt mirror 36 rotates centering around the rotational axis parallel to the Z axis from the state in parallel with the Y-Z plane by an angle due to an electrostatic force. The tilt mirror 36, the holders and hinges 39 on right and left sides of the mirror and the platform 34 constitute an MEMS mirror unit 41.

Figure 4:
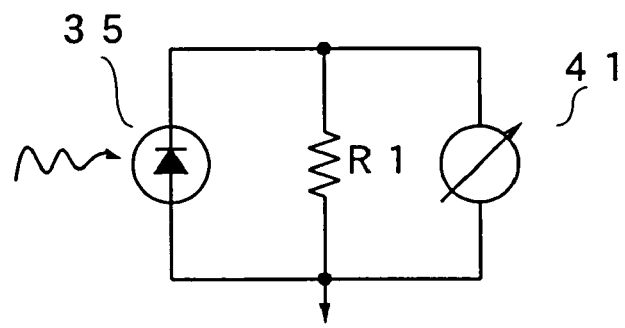
FIG. 4 is an equivalent circuit showing a photo diode, an MEMS mirror unit and a peripheral circuit in accordance with the first embodiment.

An anode of the photo diode 35 is connected in wire bonding to the first electrode 38a via a pattern 42. A pattern, not shown, from a base (cathode) of the photo diode 35 to the second electrode 40a is formed. FIG. 4 is an equivalent circuit showing the photo diode 35, the MEMS mirror unit 41 and a load resistance R1 connected to the photo diode 35 in parallel. Furthermore, a reflector 43 shaped like a triangle pole is provided on the platform 34. The reflector 43 has an inclined surface as a reflection surface, reflects the signal light on the reflection surface and emits light deflected on the X-Y plane by a certain angle relative to the X axis direction.

Furthermore, as shown in FIG. 2, on the optical axis, a reflection unit 44 is provided lateral to the filter 33. The reflection unit 44 is shaped like a symmetrical rectangular parallelepiped with a reflection surface having a trapezoidal cross section on its lower face. The reflection surface includes a first reflection plane 44a that is inclined at a certain angle relative to the Y-Z plane and reflects the signal light to the MEMS mirror unit 41, a central second reflection plane 44b parallel to the Y-Z plane and a third reflection plane 44c that is opposed to the inclined surface of the reflector 43, is inclined in the reverse direction to the first reflection plane 44a at a certain angle relative to the Y-Z plane and reflects the light from the MEMS mirror unit 41 thereon again so as to enter the light into the Y-Z plane. Thus, as shown in FIG. 2, the incident light and the light reflected on the tilt mirror 36 are reflected. The probe 31 is further provided with a transparent window 31a for emitting the light to the outside within a deflection range of the light emitted from the reflector 43.

Figure 5A:
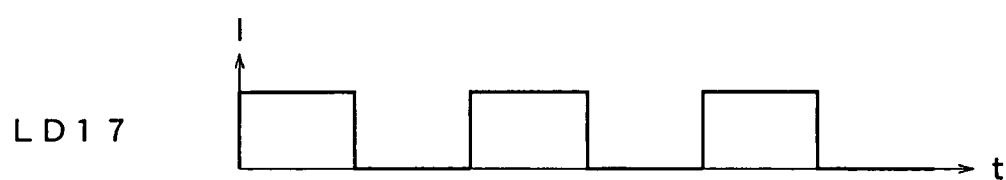
FIG. 5A is a waveform chart showing an output waveform of a laser diode in accordance with the first embodiment.

Next, operations in this embodiment will be described. As shown in FIG. 5A, the driver 18 drives the laser diode 17 in a certain frequency, such as 30 Hz. A vertical axis of FIG. 5A represents output level of the laser diode 17 and a horizontal axis of FIG. 5A represents time. The driving waveform may be like a rectangle wave as shown in the figure or a sine curve. Thus, the optical output of the laser diode 17 varies periodically. This excitation light is supplied to the optical coupler 14 via the optical fiber 19. The driver 12 drives the tunable laser 11 to periodically change the wavelength within a range of 100 nm, for example, centering on 1.3 μm. For example, the tunable laser 11 oscillates the signal light, whose wavelength repeatedly changes in the waveband of 1.3 μm in a frequency of 15 KHz at high speed. The signal light enters the optical coupler 14 via the optical fiber 13. The signal light and excitation light are combined by the optical coupler 14 and the combined light enters the optical fiber 21 via the optical circulator 16. Furthermore, the light is transmitted to the probe 31 via the optical fiber 21.

Figure 5B:
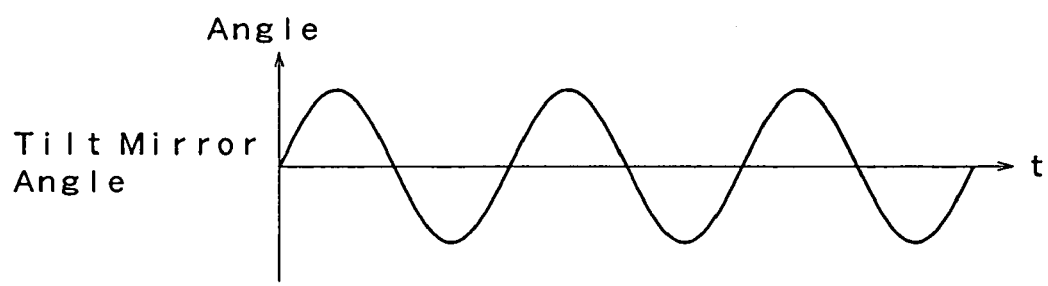
FIG. 5B is a waveform chart showing a change in angle of a tilt mirror in accordance with the first embodiment.

The combined light is converted into collimate light or a beam focused on a surface of the measuring area by the GRIN lens 32 and only the excitation light is reflected on the optical filter 33. The excitation light reflected on the optical filter 33 is converted into a voltage by the photo diode 35 and the voltage is supplied to the MEMS mirror unit 41. In the MEMS mirror unit 41, the electric signal modulated at a frequency according to a modulation frequency of the excitation light is supplied to an electrode. Thus, the tilt mirror 36 rotates centering around the rotational axis at the hinges 39. A rotation angle of the tilt mirror forms a sine curve as shown in FIG. 5B.

The signal light passing through the optical filter 33 is reflected on the first reflection plane 44a of the reflector 44 and supplied to the tilt mirror 36. The light reflected on the tilt mirror 36 enters the second reflection plane 44b and is reflected there again. The reflected light is further reflected on the tilt mirror 36 and then on the third reflection plane 44c, and enters the reflector 43. When the reflection surface of the tilt mirror 36 is parallel to the Y-Z plane, the incident light to the reflector 43 becomes parallel with the Z axis. With the rotation of the tilt mirror 36, the light is deflected by the tilt mirror 36 and further deflected on the X-Y plane through two reflections. The light is reflected on the reflection surface of the reflector 43, deflected in the X-Y plane centering around the x-axis and emitted from the probe 31. The emitted light is irradiated to a region of the measuring object. The light reflected on the measuring region passes through the reflector 43 through the same path as the incident light, is reflected on the reflector 44 and the tilt mirror 36, passes through the optical filter 33 and returns to the diagnosis device via the optical fiber 21.

In the diagnosis device, the reflected light returned via the optical fiber 21 is transmitted to the optical fiber 22 by the optical circulator 16 and converted into an electric signal by the photo diode 24. The signal of the reflected light is analyzed by the analyzer 26 and the analyzed signal is displayed on the monitor 27. In the case of swept source optical coherence tomography (SS-OCT), by performing frequency analysis of the signal light returned from the measuring region, information on reflection intensity distribution along the depth is obtained, and by deflecting the light in a horizontal direction of one dimension with respect to the surface of the region, a tomographic image of two dimension can be obtained. Since the scanning in the depth direction is performed in 15 KHz as a wavelength variable frequency of the tunable laser and deflection in the horizontal direction is performed in 30 Hz, a high-resolution tomographic image having a maximum resolution of 15 KHz/30 Hz=500-pixel in the horizontal direction can be presented. The resolution in the vertical direction depends on the variable range of the tunable laser.

In addition, in the first embodiment, the signal light is reflected between the reflector and the tilt mirror twice. Thus, even when the rotational angle of the tilt mirror is small, the deflection angle can be made larger. The number of reflections on the upper face of the tilt mirror may be once, or three times or more. When the light is deflected around the central axis of the probe in the Y-Z plane and emitted, the reflector 43 becomes unnecessary.

Although the tunable laser is used as a light source for signal in the first embodiment, a light source for generating light of a certain wavelength may be adopted. In the case of diagnosis having a different measuring object or measuring method such as a surface profile and a spectral distribution on the surface, a light source corresponding to the diagnosis, for example, a wideband light source such as a white light source may be used. Also in this case, the measuring area is scanned by moving the probe itself in the Z axis direction at a certain speed, a three dimensional volume image with tomography method or two dimensional distribution of the surface can be obtained.

Second Embodiment

Next, a second embodiment of the present invention will be described referring to FIGS. 6 to 8. FIG. 6 is a block diagram showing a configuration of the diagnosis device. The same reference numerals are given to similar components to those in the first embodiment and detailed description thereof is omitted. In this embodiment, the laser diode 17 and driver 18 are replaced with two laser diodes 17a, 17b and drivers 18a, 18b. The driver 18a and laser diode 17a constitute a second light source for generating a first excitation light of a first wavelength $\lambda p1$. The laser diode 17b and driver 18b constitute a third light source for generating the second excitation light of a wavelength $\lambda p2$. The drivers 18a, and 18b drive the laser diodes 17a and 17b respectively so that light intensity may vary in each different periods. The wavelengths $\lambda p1$, $\lambda p2$ are different from the signal light $\lambda s$. For example, $\lambda p1$ is set as 1510 to 1520 nm and $\lambda p2$ as 1550 to 1560 nm. An optical coupler 14a combines the first excitation light with the second excitation light emitted from the optical fiber 13 and two optical fibers 19a, 19b. The tunable laser 11, the driver 12 and a block of lens 23 to the monitor 27 are the same as in the first embodiment.

Figure 7:
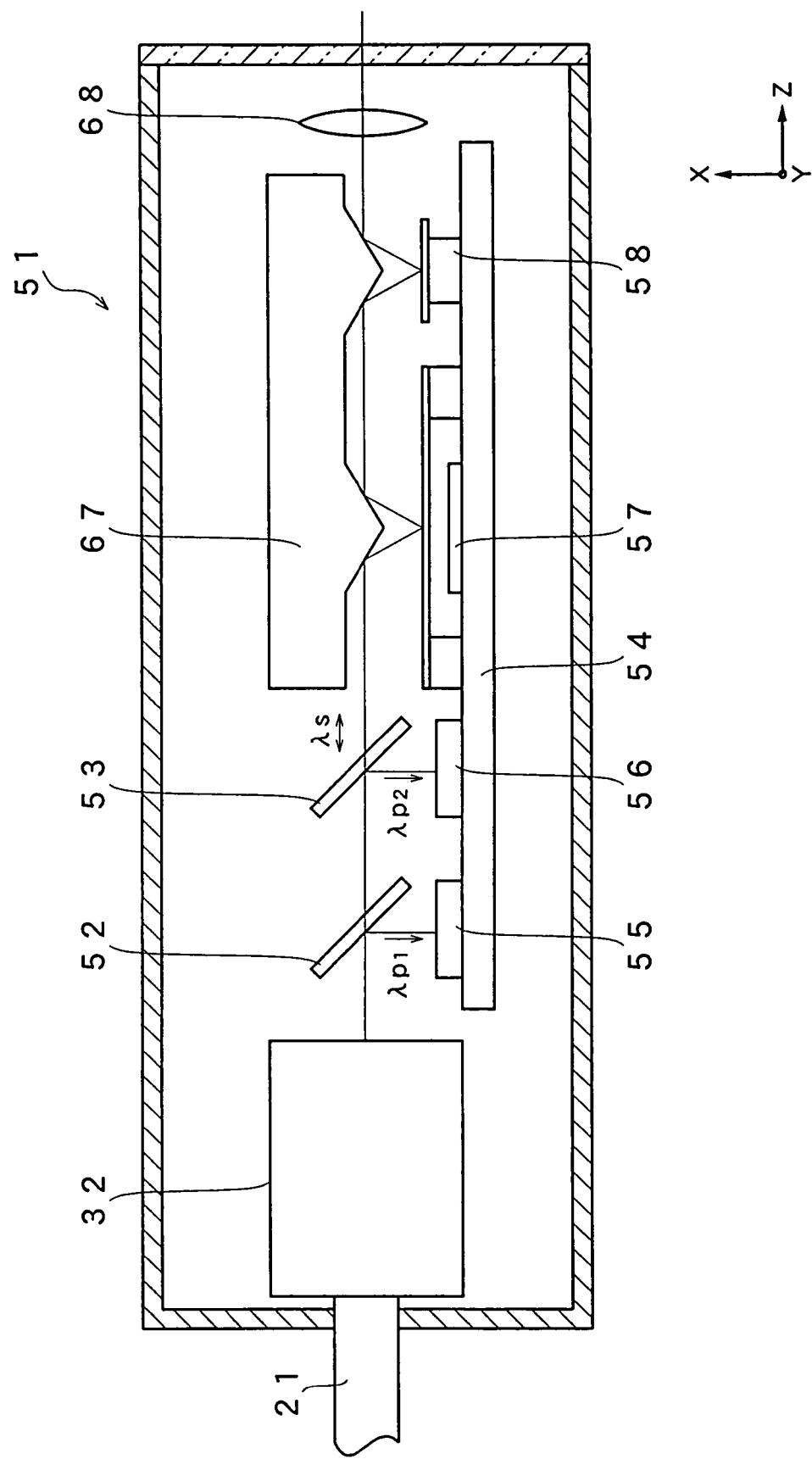
FIG. 7 is a sectional view of a probe in accordance with the second embodiment.
Figure 8:
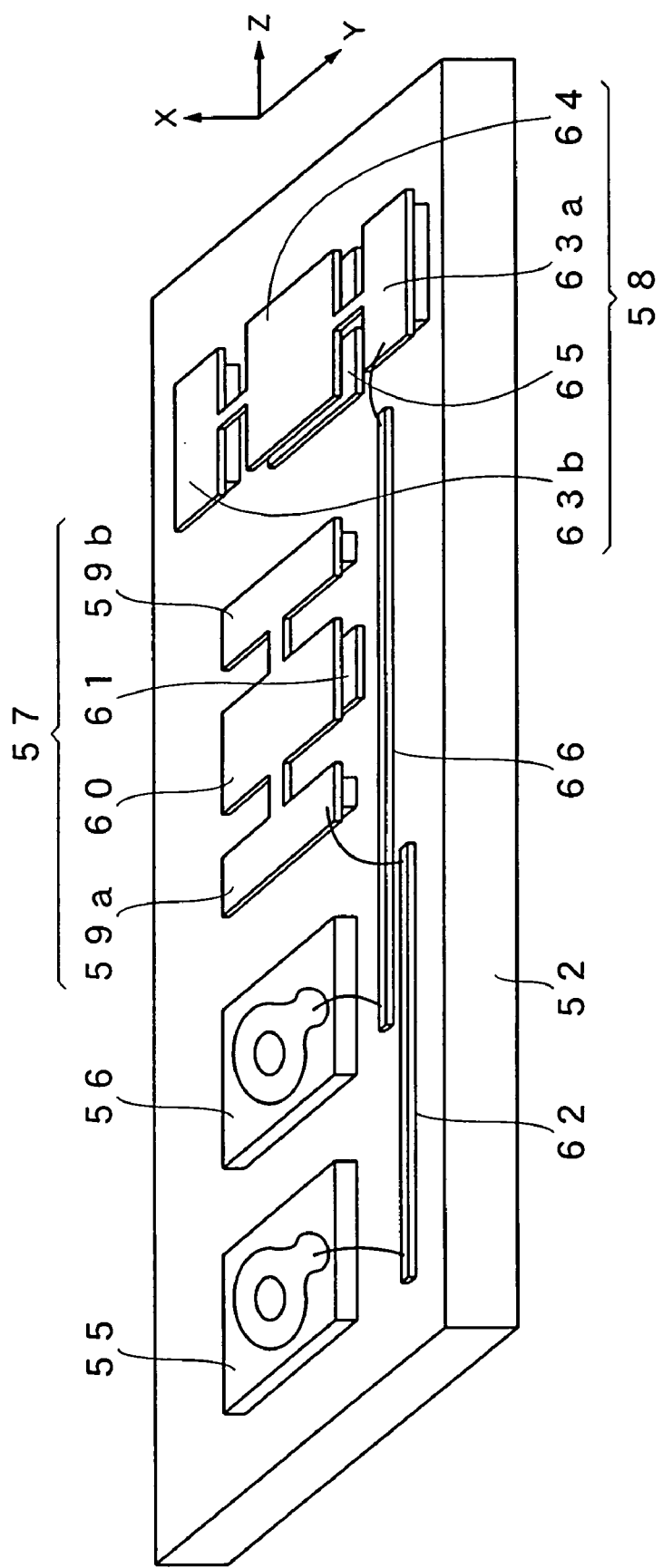
FIG. 8 is a perspective view showing a main part of the probe in accordance with the second embodiment.

As shown in FIG. 7 in detail, in a probe 51, light emitted from the GRIN lens 32 is diverged by two optical filters 52, 53. The optical filter 52 reflects a first excitation light of wavelength $\lambda p1$ thereon and lets the other light pass through. The optical filter 54 reflects the second excitation light of wavelength $\lambda p2$ and lets the signal light pass through. Photo diodes 55, 56 are provided on the platform 54 at positions that the first and the second excitation lights is received. Furthermore, two MEMS mirror units 57, 58 are also provided on the platform 54. As shown in FIG. 8, as in the first embodiment, the MEMS mirror unit 57 is formed by connecting a tilt mirror 60 which has holders 59a, 59b on the right and left sides with hinges. As in the first embodiment, an electrode 61 is provided on a lower face of the tilt mirror 60. An upper electrode of the holder 59a is connected to an output of the photo diode 55 via a pattern 62. As in the figure, the MEMS mirror unit 58 includes holders 63a, 63b along the Y axis and the holders rotatably hold a tilt mirror 64 with the hinges at the center thereof. An electrode 65 is provided on a lower face of the tilt mirror 64. An upper electrode of the holder 63a is connected to the photo diode 59 via a pattern 66. The MEMS mirror unit 57 rotates the tilt mirror 60 centering around along the Z axis and the MEMS mirror unit 58 rotates the tilt mirror 64 centering around the Y axis. As shown in FIG. 7, a reflector 67 is set above the MEMS mirror unit. The reflector 67 has a V-shaped reflector at a central lower part of the MEMS mirror unit 57 and inclined surfaces of the V-shaped reflector are defined as first and second reflection planes, respectively. The reflector 67 has also a V-shaped reflector at the central lower part of the MEMS mirror unit 58 and inclined surfaces of the V-shaped reflector are defined as third and fourth reflection planes, respectively. A lens 68 is set along the optical axis.

Next, operations in the second embodiment will be described. As shown in FIG. 9A, the driver 18a performs amplitude modulation for the laser diode 17a of the wavelength $\lambda p1$ at a certain frequency. The driver 18b performs amplitude modulation for the laser diode 17b of the wavelength $\lambda p2$ at a frequency much lower than the certain frequency, for example, in a 100-fold period. At this time, the drivers 18a, 18b are synchronized with each other. The driver 12 of the tunable laser 11 is changed at a frequency much higher than the driver 18a. The light of these wavelengths $\lambda s$, $\lambda p1$ and $\lambda p2$ are combined and the combined light is transmitted to the probe 51 via the optical fiber 21. In the probe 51, the light of wavelength $\lambda p1$ is reflected on the optical filter 52 and the light of the wavelength $\lambda p2$ is reflected on the optical filter 53 to be supplied to the photo diodes 55 and 56, respectively. By feeding an electromotive force obtained by the photo diode 55 to the MEMS mirror unit 57 and an electromotive force obtained by the photo diode 56 to the MEMS mirror unit 58, the both mirrors can rotate around the rotational axis in the Z axis direction and the rotational axis in the Y axis direction, respectively. In this manner, the raster scanning of light can performed in two dimensions within the X-Y plane and thus the light can be deflected in two dimensional planes. Here, since the tunable laser the signal wavelength changes, information on the depth of the measuring area can be obtained and thus a three-dimensional image can be obtained through image processing.

In this embodiment, the tunable laser is used as the light source for signals. However, in the case of diagnosis having a different measuring object and or measuring method such as the surface profile and the spectral distribution on the surface, a light source corresponding to the diagnosis, for example, a light source of a certain wavelength, or the wideband light source such as the white light source may be used.

Figure 10:
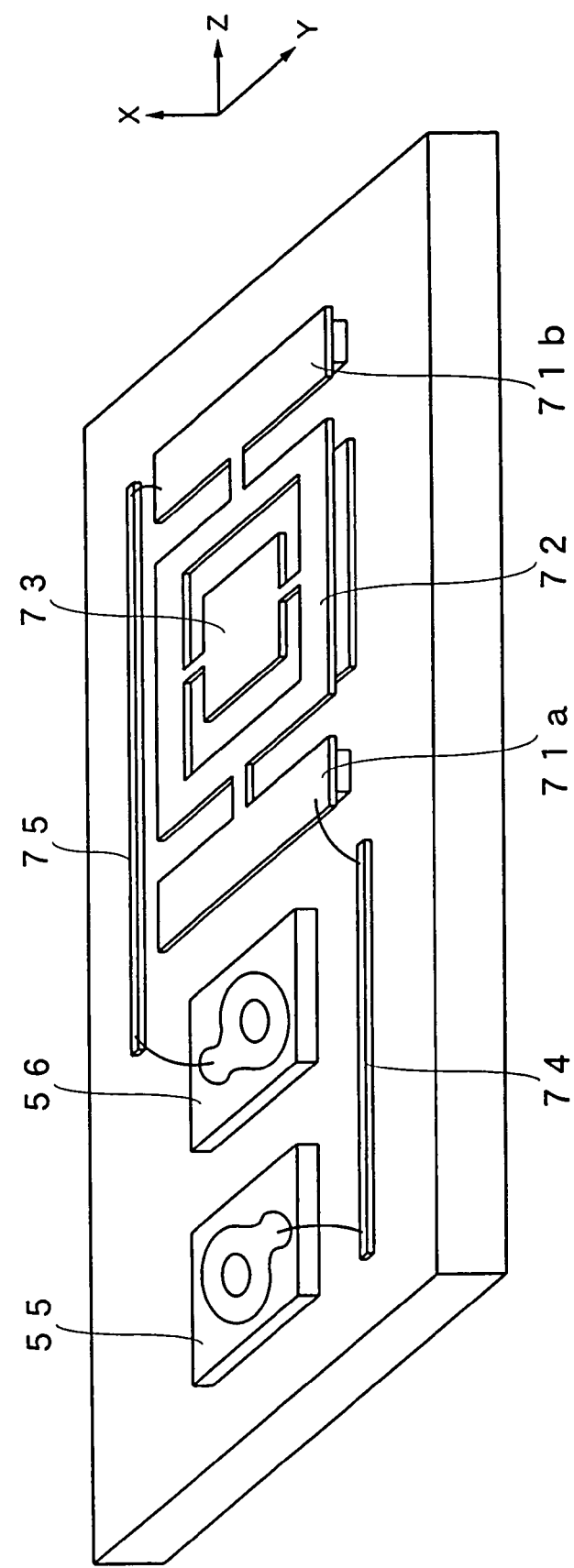
FIG. 10 is a perspective view showing a main part of the probe in accordance with a modification of the second embodiment.
Figure 11:
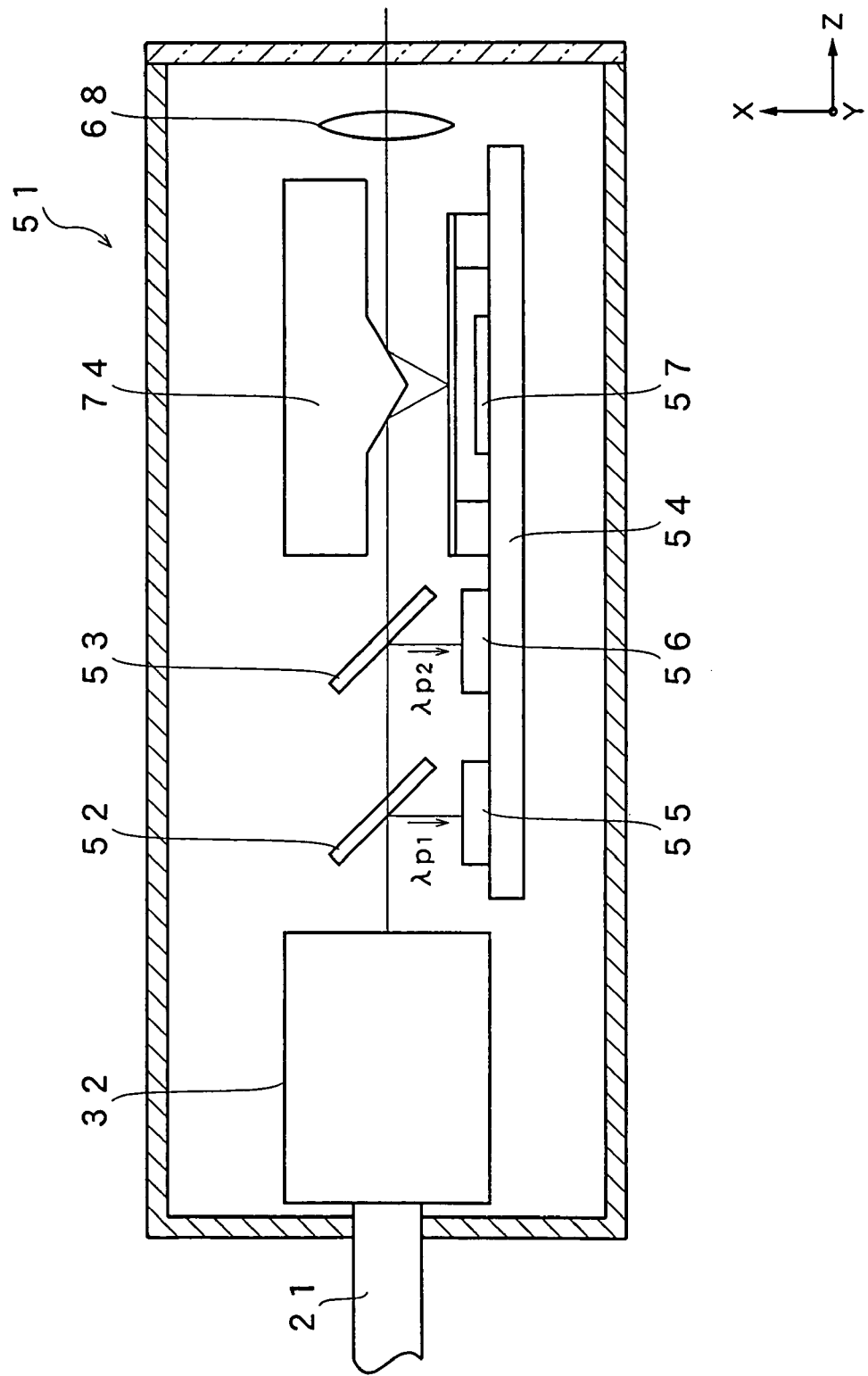
FIG. 11 is a cross-section view of the probe in accordance with the modification of the second embodiment.

As shown in FIG. 10, a gimbal configuration in which a mirror unit 72 held by holders 71a and 71b is provided in place of the MEMS mirror unit described in this embodiment, an opening is formed in the center of the mirror unit 72 and a smaller mirror part 73 is rotatably held in the center of the mirror unit 72 may be employed. In this case, outputs of the photo diodes 55 and 56 are connected to the corresponding holders via patterns 74 and 75, respectively, to drive the mirror unit 72 and central mirror 73. FIG. 11 is a cross-section view of the probe in this modification. In this case, a reflector 74 has a pair of V-shaped reflection planes. With this configuration, since the central mirror part 73 can be rotatable centering around the Z axis and Y axis, the number of reflections is reduced and the signal light can be deflected in two dimensions.

The optical filters 52 and 53 of the second embodiment can be embodiment by any kinds of filters to spilt into the signal light and the first and second excitation lights.

Third Embodiment

Figure 12:
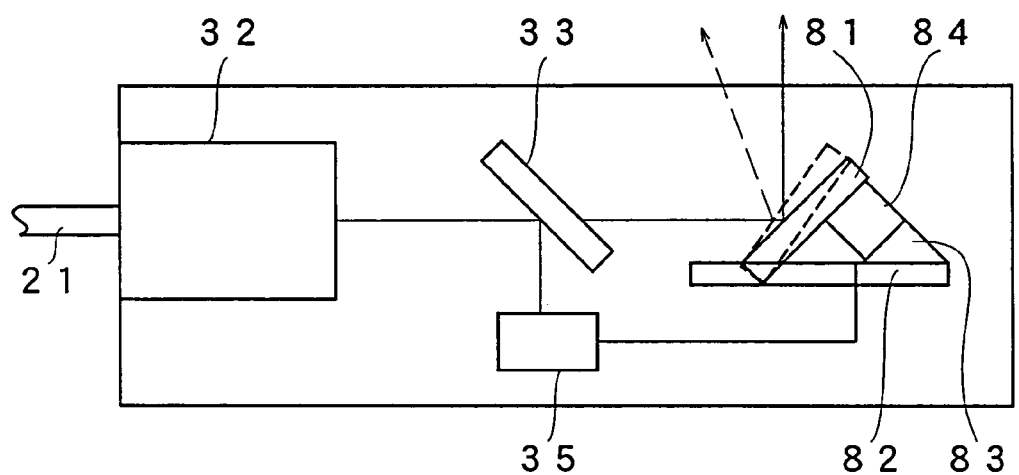
FIG. 12 is a schematic view showing a main part of a probe in accordance with a third embodiment of the present invention.

Subsequently, a third embodiment will be described referring to FIG. 12. In the pres embodiment, the same reference numerals are given to similar components to those in the first embodiment and detailed description thereof is omitted. Although the MEMS type mirror is used in the first and second embodiments as an actuator, the minute mirror is deflected using a piezo type actuator in the present embodiment. FIG. 12 is a schematic view of an optical deflection probe using the piezo type actuator. In FIG. 12, as in the first embodiment, the optical filter 33 is set at the emitting side of the GRIN lens 32, reflects the excitation light thereon and lets the signal light pass through. A photo diode 35 is provided at the position at which the reflected light is received. In the present embodiment, as shown in the figure, a mirror 81 is rotatably held on a substrate 82 at the position at which the light passing through the optical filter 33 is reflected. A spacer 83 having a triangular cross section is held on the substrate 82 and a piezo actuator 84 whose length itself varies depending on voltages is provided between an inclined surface of the spacer 83 and the mirror 81. An electromotive force obtained by the photo diode 35 is supplied to the piezo actuator 84. In this manner, an angle of the mirror 81 is changed due to the electromotive force obtained by the photo diode 35, thereby deflecting the light.

Although the MEMS mirror or the piezo actuator is used as an optical deflector in the above-mentioned embodiments, as far as a component which changes a mechanical position of the mirror due to the electromotive force obtained by the photoelectric conversion element, the component may be combined with the mirror to deflect the light.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application No. 2005-114300 filed on Apr. 12, 2005 is hereby incorporated by reference.

What is claimed is:

1. An optical deflection probe device comprising:
 a first light source for emitting signal light;
 a second light source for emitting excitation light which has different wavelength from that of said signal light and whose optical intensity can be modulated;
 an optical fiber connected to said first and second light sources at one end thereof for simultaneously transmitting said signal light, excitation light and reflected light; and
 a probe provided at other end of said optical fiber,
 wherein said probe includes:
 an optical filter for separating said signal light from excitation light emitted from the other end of said optical fiber;
 a photoelectric conversion element for receiving excitation light separated by said optical filter; and
 an optical deflector that is driven due to an electromotive force obtained by said photoelectric conversion element and deflects the signal light separated by said optical filter.

2. The optical deflection probe device according to claim 1, wherein said optical deflector is a MEMS type mirror unit.

3. The optical deflection probe device according to claim 1, wherein said optical deflector includes a mirror and a piezo actuator for driving said mirror.

4. The optical deflection probe device according to claim 1, wherein said probe further includes a reflector unit for reflecting light passing through said optical filter toward said optical deflector.

5. The optical deflection probe device according to claim 1, wherein said probe further includes a reflector for further reflecting light deflected by said optical deflector.

6. The optical deflection probe device according to claim 1, wherein
 said optical deflector is a MEMS type mirror unit, and
 said probe includes a reflector unit for reflecting light passing through said optical filter toward said MEMS type mirror unit and further reflecting the reflected light from said MEMS type mirror unit.

7. An optical deflection probe device comprising:
 a first light source for emitting signal light;
 a second light source for emitting first excitation light which has different wavelength from that of said signal light and whose optical intensity can be modulated;
 a third light source for emitting second excitation light which has different wavelength from those of said signal light and first excitation light and whose optical intensity can be modulated;
 an optical fiber connected to said first, second, and third light sources at one end thereof for simultaneously transmitting said signal light, first and second excitation lights and reflected light; and
 a probe provided at other end of said optical fiber,
 wherein said probe includes:
 optical filters for splitting into said signal light, first excitation light and second excitation light emitted from the other end of said optical fiber;
 a first photoelectric conversion element for receiving first excitation light separated by said optical filters;
 a second photoelectric conversion element for receiving second excitation light separated by said optical filters; and
 an optical deflector that is driven due to electromotive forces obtained by said first and second photoelectric conversion elements and deflects the signal light separated by said optical filters to directions different from each other.

8. The optical deflection probe device according to claim 7, wherein said optical deflector is a MEMS type mirror unit.

9. The optical deflection probe device according to claim 7, wherein said optical deflector includes a mirror and a piezo actuator for driving said mirror.

10. The optical deflection probe device according to claim 7, wherein said probe further includes a reflector unit for reflecting light passing through said optical filter toward said optical deflector.

11. The optical deflection probe device according to claim 7, wherein said probe further includes a reflector for further reflecting light deflected by said optical deflector.

12. The optical deflection probe device according to claim 7, wherein
 said optical deflector is a MEMS type mirror unit, and
 said probe includes a reflector unit for reflecting light passing through said optical filter toward said MEMS type mirror unit and further reflecting the reflected light from said MEMS type mirror unit.

13. An optical deflection probe comprising:
 an optical filter which connects to an optical fiber transmitting signal light and excitation light which has different wavelength from that of said signal light, and which separates said signal light from excitation light emitted from the other end of said optical fiber;
 a photoelectric conversion element for receiving excitation light separated by said optical filter; and
 an optical deflector that is driven due to an electromotive force obtained by said photoelectric conversion element and deflects the signal light separated by said optical filter.

14. The optical deflection probe according to claim 13, wherein said optical deflector is a MEMS type mirror unit.

15. The optical deflection probe according to claim 13, wherein said optical deflector includes a mirror and a piezo actuator for driving said mirror.

16. The optical deflection probe according to claim 13, wherein said probe further includes a reflector unit for reflecting light passing through said optical filter toward said optical deflector.

17. The optical deflection probe according to claim 13, wherein said probe further includes a reflector for further reflecting light deflected by said optical deflector.

18. The optical deflection probe according to claim 13, wherein
said optical deflector is a MEMS type mirror unit, and
said probe includes a reflector unit for reflecting light passing through said optical filter toward said MEMS type mirror unit and further reflecting the reflected light from said MEMS type mirror unit.

19. An optical deflection probe comprising:
optical filters which connect to an optical fiber transmitting signal light, first and second excitation lights which have different wavelengths from each other and split into said signal light, first excitation light and second excitation light emitted from the other end of said optical fiber;

a first photoelectric conversion element for receiving first excitation light separated by said optical filters;

a second photoelectric conversion element for receiving second excitation light separated by said optical filters; and an optical deflector that is driven due to electromotive forces obtained by said first and second photoelectric conversion elements and deflects the signal light separated by said optical filters to directions different from each other.

* * * * *